United States Patent
Jelinek

(10) Patent No.: US 11,677,333 B2
(45) Date of Patent: Jun. 13, 2023

(54) MULTI SWITCH INVERTER, PERSONAL POWER PLANT SYSTEM USING THEREOF AND METHOD TO GENERATE AC POWER SINE WAVE

(71) Applicant: EKERGY ENERGY, INC., Irvine, CA (US)

(72) Inventor: Howard John Jelinek, Laguna Beach, CA (US)

(73) Assignee: EKERGY ENERGY, INC., Irvine, CA (US)

(*) Notice: Subject to any disclaimer, the term of this patent is extended or adjusted under 35 U.S.C. 154(b) by 0 days.

(21) Appl. No.: 18/069,863

(22) Filed: Dec. 21, 2022

(65) Prior Publication Data

US 2023/0127930 A1 Apr. 27, 2023

Related U.S. Application Data

(63) Continuation-in-part of application No. 17/931,267, filed on Sep. 12, 2022, which is a continuation of
(Continued)

(51) Int. Cl.
*H02M 7/5387* (2007.01)
*H02J 3/38* (2006.01)
(Continued)

(52) U.S. Cl.
CPC .......... *H02M 7/5387* (2013.01); *H02J 3/381* (2013.01); *H02J 7/0013* (2013.01); *H02J 7/35* (2013.01);
(Continued)

(58) Field of Classification Search
CPC ...... H02M 7/5387; H02M 1/12; H02M 7/483; H02J 3/38; H02J 3/381; H02J 7/0013;
(Continued)

(56) References Cited

U.S. PATENT DOCUMENTS 4,032,832 A 6/1977 Miller
9,203,336 B2 12/2015 Butzmann et al.
(Continued)

FOREIGN PATENT DOCUMENTS

| CA | 2663324 A1 | 10/2010 |
|---|---|---|
| JP | 2013-158179 A | 8/2013 |
| WO | WO 2021/038926 A1 | 3/2021 |

OTHER PUBLICATIONS

International Search Report and Written Opinion issued for International Patent Application No. PCT/US2022/026823, dated Aug. 18, 2022 in 7 pages.

*Primary Examiner* — Robert L Deberadinis
(74) *Attorney, Agent, or Firm* — Knobbe, Martens, Olson & Bear, LLP

(57) ABSTRACT

An inverter with an amplitude pulse width (APW) architecture that generates a single phase AC (Alternating Current) power waveform is disclosed. The inverter generates a multi-level stepped voltage waveform, each step of the multi-level stepped waveform having a modulated width of a selected voltage. The inverter further comprises a soft fuse protection system. This disclosure also relates to a personal power plant system using said inverter and a method to generate an AC power sine wave with reduced harmonic distortion.

20 Claims, 7 Drawing Sheets

Related U.S. Application Data application No. 17/661,212, filed on Apr. 28, 2022, now Pat. No. 11,444,550.

(60) Provisional application No. 63/183,165, filed on May 3, 2021.

(51) Int. Cl.
  *H02J 7/00* (2006.01)
  *H02M 1/12* (2006.01)
  *H02J 7/35* (2006.01)
  *H02M 7/483* (2007.01)

(52) U.S. Cl.
  CPC ............. *H02M 1/12* (2013.01); *H02M 7/483* (2013.01); *H02J 2300/24* (2020.01); *H02J 2310/14* (2020.01)

(58) Field of Classification Search
  CPC ...... H02J 7/35; H02J 2300/24; H02J 2310/14; H02J 7/00
  See application file for complete search history.

(56) References Cited

U.S. PATENT DOCUMENTS

| | | |
|---|---|---|
| 10,483,870 B2 | 11/2019 | Ng et al. |
| 10,615,610 B1 | 4/2020 | Jelinek |
| 11,444,550 B1 | 9/2022 | Jelinek |
| 2008/0298098 A1 | 12/2008 | Wagoner |
| 2014/0112040 A1 | 4/2014 | White |
| 2016/0056731 A1 | 2/2016 | Brotto et al. |
| 2016/0372971 A1 | 12/2016 | Budde |

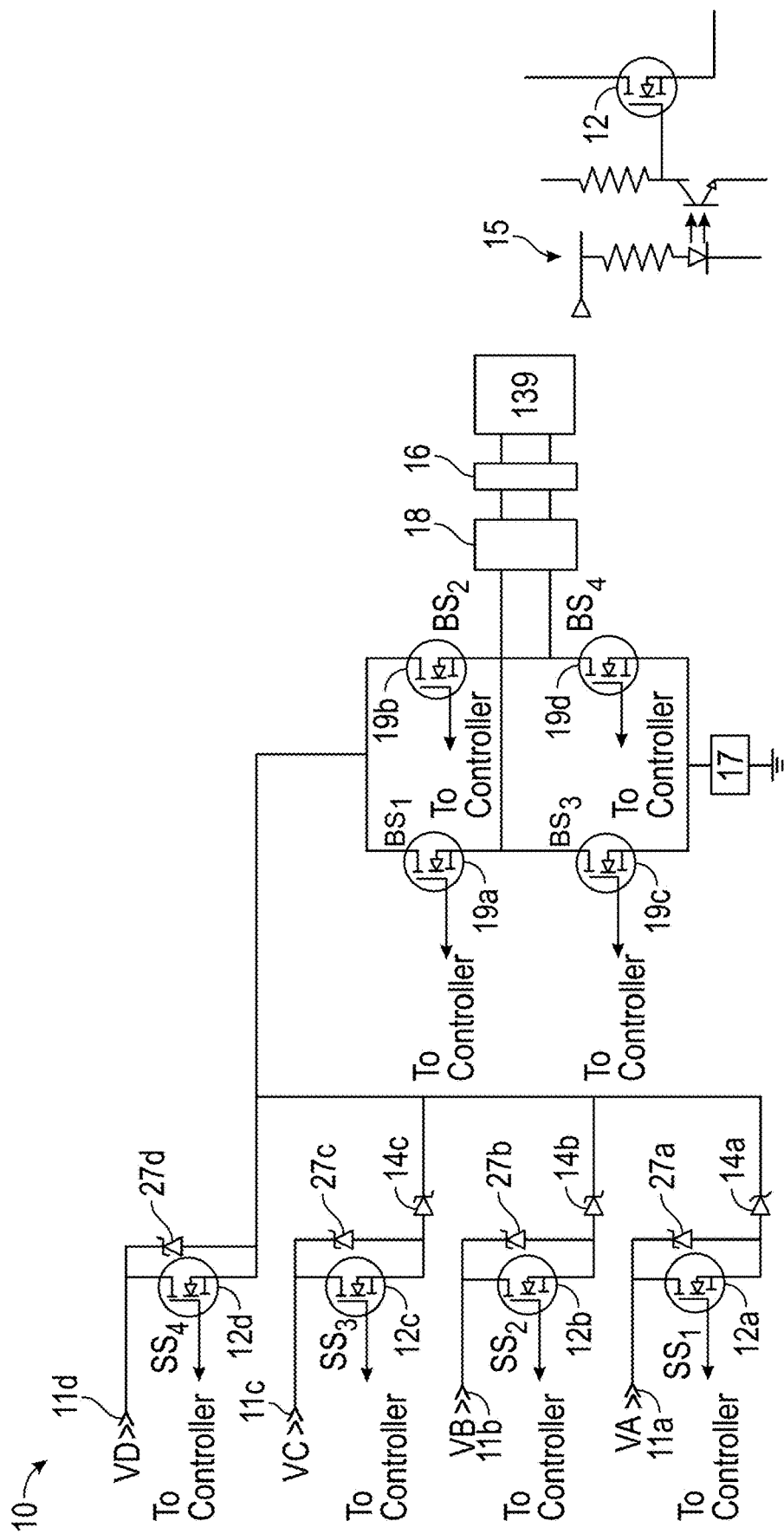

MULTI SWITCH INVERTER, PERSONAL POWER PLANT SYSTEM USING THEREOF AND METHOD TO GENERATE AC POWER SINE WAVE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application claims the benefit of U.S. Provisional Application No. 63/183,165, filed May 3, 2021, which is hereby incorporated herein in its entirety.

FIELD OF THE INVENTION

This disclosure relates generally to DC to AC converter-inverter-with an amplitude pulse width (APW) architecture that generates single phase AC (Alternating Current) power signal and a personal power plant system using said inverter. This disclosure also relates to a method to generate an AC power sine wave with specified harmonic distortion.

BACKGROUND

Generating low harmonic "clean" 50/60 cycle AC electrical power can be accomplished in several ways. Rotational electro mechanical generators, which have been available for over 100 years, are used for most high voltage, high power schemes. Motor-generator sets are in wide industrial use and use AC motors to drive DC (Direct Current) generators and vice versa. Both small (less than 100 kilo-Watts) and large scale generators use energy conversion motive methods such as steam turbines, water, wind turbines, or internal combustion engines, etc. One form of energy is converted to motional (rotational) action to drive AC or DC generators. The purity of the AC (sine wave) depends on a number of factors including the stability of the rotation of the generator shaft, the number of generator poles and the 'linearity' of the magnetic circuits.

SUMMARY

An electrical AC generator, known in the industry as inverters, are also used to convert DC (Direct Current) voltage to AC (Alternating Current) power. The AC output voltage magnitude, frequency, signal purity and conversion efficiency are determined by the design requirements and the design implementation. Solid state (electronic) inverter solutions provide high quality AC using switching devices including transistors, SCR's (Silicon Controlled Rectifiers), IGFETS (Insulated-Gate Field-Effect Transistors) and rectifiers.

The solid state inverter can provide high efficiency and low cost solutions. However a major challenge is reducing harmonics and maintaining zero voltage offset in the AC output. The present invention therefore provides an AC generator/inverter to minimize costs and maximize efficiency and performance by employing a 'stepped' (variable) DC voltage energy source with an amplitude pulse width (APW) architecture that can support modified step and width sizing to reduce harmonic distortion and eliminate voltage offset. Unlike conversion architectures that use variable voltage solutions, the APW architecture creates multiple "steps" using fixed-voltage string-connected batteries.

In view of the above mentioned capability, one of the objectives of the present invention is to provide an inverter which generates a multi-level stepped voltage waveform, each step of the multi-level stepped waveform having a modulated width of a selected voltage.

In some embodiments, the inverter may comprise a plurality of DC (direct current) input terminals and a plurality of semiconductor switches which are coupled to respective DC input terminals of the plurality of DC input terminals. The inverter may further comprise a bridge circuit, which is electrically connected to the plurality of semiconductor switches and configured to switch a polarity of a voltage applied to a load coupled thereto. A plurality of Schottky diodes can be disposed between a corresponding semiconductor switch of the plurality of semiconductor switches and the bridge circuit to prevent reverse current flow and reduced transistor switching losses.

In some other embodiments, each semiconductor switch may comprise a silicon carbide metal—oxide—semiconductor field-effect transistor (SiC MOS-FET) and may be configured to operate through optocouplers for electric isolation. The bridge circuit may be an H-bridge comprising low Rds MOS-FETs.

In yet other embodiments, the inverter may further comprise a harmonic filter, to reduce voltage and current spikes and harmonics in the multi-level stepped waveform, and a load current sensor and a watt-hour meter electrically coupled to the bridge circuit.

Another aspect of some embodiments is to provide a Personal Power Plant (PPP) system comprising the inverter which generates a multi-level stepped voltage waveform, each step of the multi-level stepped waveform having a modulated width of the selected voltage. The PPP system locates storage and generation at the load site, provides real time or near real time load balancing and directly supports integration of renewable energy generation.

In yet another object of some embodiments is to provide a method for converting DC voltage to an AC power sine wave with reduced harmonic distortion using the inverter to generate a multi-level stepped voltage waveform, where each step of the multi-level stepped waveform has a modulated width of a selected voltage.

In an aspect, an inverter is disclosed. The inverter comprises a plurality of DC (direct current) input terminals wherein each DC input terminal is configured to electrically couple to a respective DC energy source; a plurality of semiconductor switches electrically coupled to respective DC input terminals of the plurality of DC input terminals; a bridge circuit, wherein the bridge circuit is electrically connected to the plurality of semiconductor switches and configured to switch a polarity of a voltage applied to a load coupled thereto; and a plurality of Schottky diodes to prevent backward current flow, wherein an anode of each Schottky diode is electrically coupled to a corresponding semiconductor switch of the plurality of semiconductor switches and a cathode of each Schottky diode is electrically coupled to the bridge circuit; wherein the plurality of semiconductor switches connect and disconnect DC current from the respective DC input terminals to the bridge circuit according to received switching sequences such that a multi-level stepped voltage waveform is generated, each step of the multi-level stepped waveform having a modulated width of a selected voltage.

In an aspect, each semiconductor switch is configured to operate through optocouplers for electric isolation. In an aspect, each semiconductor switch comprises a silicon carbide metal—oxide—semiconductor field-effect transistor (SiC MOS-FET). In an aspect, the bridge circuit comprises an H-bridge. In an aspect, the H-bridge comprises SiC MOS-FETs.

In an aspect, the inverter further comprises a harmonic filter to reduce spikes and harmonics in the multi-level stepped waveform. In an aspect, the inverter further comprises a load current sensor and a watt-hour meter electrically coupled to the bridge circuit.

In an aspect, a personal power plant system is disclosed. The personal power plant comprises an input selector configured to select a power source; a battery bank comprising a plurality of battery cassettes coupled in series, wherein each battery cassette comprises a plurality of batteries connected in series; a charger configured to charge the battery bank using electrical energy from the selected power source; a battery selector comprising a plurality of switches configured to select one or more of the plurality of battery cassettes to charge; a plurality of solar panels electrically coupled to respective battery cassettes of the battery bank, wherein ones of the plurality of solar panels are selectively coupled to the input selector; an inverter, wherein said inverter comprises: a plurality of DC input terminals wherein each DC input terminal is electrically coupled to respective battery cassettes of the battery bank; a bridge circuit configured to switch a polarity of a voltage applied to a load electrically coupled thereto; a plurality of semiconductor switches comprising MOS-FETS electrically coupled to respective DC input terminals, wherein the plurality of semiconductor switches are electrically coupled to the bridge circuit; and a plurality of Schottky diode to prevent back backward current flow, wherein an anode of each Schottky diode is electrically coupled to a corresponding semiconductor switch of the plurality of semiconductor switches and a cathode of each Schottky diode is electrically coupled to the bridge circuit; and a controller configured to generate a predetermined switching sequence to be applied to the plurality of semiconductor switches, wherein the controller is configured to sequentially connect and disconnect the MOS-FETS of the plurality of semiconductor switches to apply a multi-level stepped voltage waveform with a modulation of a selected step thereof across the bridge circuit such that an output from the bridge circuit approximates an AC power sine wave with reduced harmonic distortion.

In an aspect, the bridge circuit is an H-bridge comprising MOS-FETs. In an aspect, the controller is configured to sequentially connect and disconnect the MOS-FETS of the plurality of semiconductor switches to vary an amplitude and/or pulse width of a voltage step of the approximated AC sine wave. In an aspect, the power source comprising an electric grid, a gas generator, a wind turbine, the solar panels, and fuel cells. In an aspect, the battery bank comprises four batteries.

In an aspect, the plurality of solar panels are configured to charge respective battery cassette and an output voltage of each solar panels is greater than an output voltage of each of the plurality of battery cassette. In an aspect, each battery cassette of the plurality of battery cassette has approximately a same terminal voltage.15. The personal power plant system according to claim 14, wherein each battery cassette of the plurality of battery cassette comprises 48 volt battery or two 24 volt batteries. In an aspect, the personal power plant system further comprises a load current sensor and a watt-hour meter electrically coupled to the bridge circuit. In an aspect, the controller is configured to modify the predetermined switching sequences based at least in part on feedback from the load current sensor and the watt-hour meter.

In an aspect, a method for converting DC voltage to AC voltage is disclosed. The method comprises: with an inverter including a plurality of DC input terminals, a plurality of semiconductor switches electrically coupled to respective DC input terminals, and a bridge circuit configured to switch a polarity of a voltage applied to a load coupled thereto, connecting a plurality of battery cassettes in series to form a battery bank, wherein a center tap is provided between the adjacent battery cassettes; connecting the center taps and a positive electrode of the battery bank to respective DC input terminals; operating the plurality of semiconductor switches according to predetermined switching sequences such that a multi-level stepped voltage waveform with a modulated width of selected step thereof is generated; applying the multi-level stepped voltage waveform to the bridge circuit; and switching the polarity of the voltage applied to the load coupled to the bridge circuit to generate an AC power sine wave with reduced harmonic distortion.

In an aspect, the multi-level stepped voltage waveform approximates a half cycle of a sine wave. In an aspect, the polarity of the voltage applied to the load coupled to the bridge circuit is switched when the multi-level stepped voltage waveform is at approximately zero voltage.

In an aspect, a soft fuse system to prevent AC over current for a power inverter is disclosed. The soft fuse system comprises a load current sensor disposed between the bridge circuit and ground to continuously monitor an inverter current, a circuit breaker electronically coupled to the bridge circuit, and a controller configured to monitor the inverter current by the load current sensor and an output voltage from the modulator, and to disable the modulator by turning off the plurality of semiconductor switches within a prescribed period of time, when the inverter current exceeds a predetermined value.

In an aspect, a method to prevent AC over current for a power inverter, which comprises a plurality of DC input terminals wherein each DC input terminal is configured to electrically couple to a respective DC energy source; a modulator comprising a plurality of semiconductor switches electrically coupled to respective DC input terminals of the plurality of DC input terminals; a bridge circuit, wherein the bridge circuit is electrically connected to the plurality of semiconductor switches and configured to switch a polarity of a voltage applied to a load coupled thereto; a plurality of Schottky diodes to prevent backward current flow, wherein an anode of each Schottky diode is electrically coupled to a corresponding semiconductor switch of the plurality of semiconductor switches and a cathode of each Schottky diode is electrically coupled to the bridge circuit; a load current sensor disposed between the bridge circuit and ground to continuously monitor an inverter current; and a circuit breaker electronically coupled to the bridge circuit, is disclosed. The method comprising continuously monitoring an inverter current by the load current sensor and an output voltage from the modulator, and disabling the modulator by turning off the plurality of semiconductor switches within a prescribed period of time, when the inverter current exceeds a predetermined value.

In an aspect, a personal power plant system is disclosed. A personal power plant system comprises an input selector configured to select a power source; a battery bank comprising a plurality of battery cassettes coupled in series, wherein each battery cassette comprises a plurality of batteries connected in series; a charger configured to charge the battery bank using electrical energy from the selected power source; a battery selector comprising a plurality of switches configured to select one or more of the plurality of battery cassettes to charge; a plurality of solar panels electrically coupled to respective battery cassettes of the battery bank, wherein ones of the plurality of solar panels are selectively coupled to the input selector; an inverter, wherein said inverter comprises: a plurality of DC input terminals wherein each DC input terminal is electrically coupled to respective battery cassettes of the battery bank; a bridge circuit configured to switch a polarity of a voltage applied to a load electrically coupled thereto; a plurality of semiconductor switches comprising MOS-FETS electrically coupled to respective DC input terminals, wherein the plurality of semiconductor switches are electrically coupled to the bridge circuit; and a plurality of Schottky diode to prevent back backward current flow, wherein an anode of each Schottky diode is electrically coupled to a corresponding semiconductor switch of the plurality of semiconductor switches and a cathode of each Schottky diode is electrically coupled to the bridge circuit; a load current sensor disposed between the bridge circuit and ground to continuously monitor an inverter current; and a circuit breaker electronically coupled to the bridge circuit, and a controller configured to generate a predetermined switching sequence to be applied to the plurality of semiconductor switches, wherein the controller is configured to sequentially connect and disconnect the MOS-FETS of the plurality of semiconductor switches to apply a multi-level stepped voltage waveform with a modulation of a selected step thereof across the bridge circuit such that an output from the bridge circuit approximates an AC power sine wave with reduced harmonic distortion, wherein the controller is further configured to monitor the inverter current by the load current sensor and an output voltage from the modulator, and to disable the modulator by turning off the plurality of semiconductor switches within a prescribed period of time, when the inverter current exceeds a predetermined value.

For purposes of summarizing the disclosure, certain aspects, advantages and novel features of the innovations have been described herein. It is to be understood that not necessarily all such advantages may be achieved in accordance with any particular embodiment. Thus, the innovations may be embodied or carried out in a manner that achieves or optimizes one advantage or group of advantages as taught herein without necessarily achieving other advantages as may be taught or suggested herein.

BRIEF DESCRIPTION OF THE DRAWINGS

The foregoing and other objectives and advantages will appear from the description herein. In the description reference is made to the accompanying drawing, which forms a part hereof, and in which is shown by way of illustration specific embodiments. These embodiments will be described in sufficient detail to enable those skilled in the art to practice the embodiments, and it is to be understood that other embodiment may be utilized and that structural changes may be made without departing from the scope of the disclosed embodiments. The accompanying drawing, therefore, is submitted merely as showing examples of the disclosed embodiments. Accordingly, the following detailed description is not to be taken in a limiting sense, and the scope of the present disclosed embodiments is defined by the appended claims.

FIG. 1A is a schematic diagram of an inverter according to certain embodiments.

FIG. 1B is a schematic diagram illustrating an operation of the semiconductor switch using an optocoupler according to certain embodiments.

DETAILED DESCRIPTION

Figure 1C:
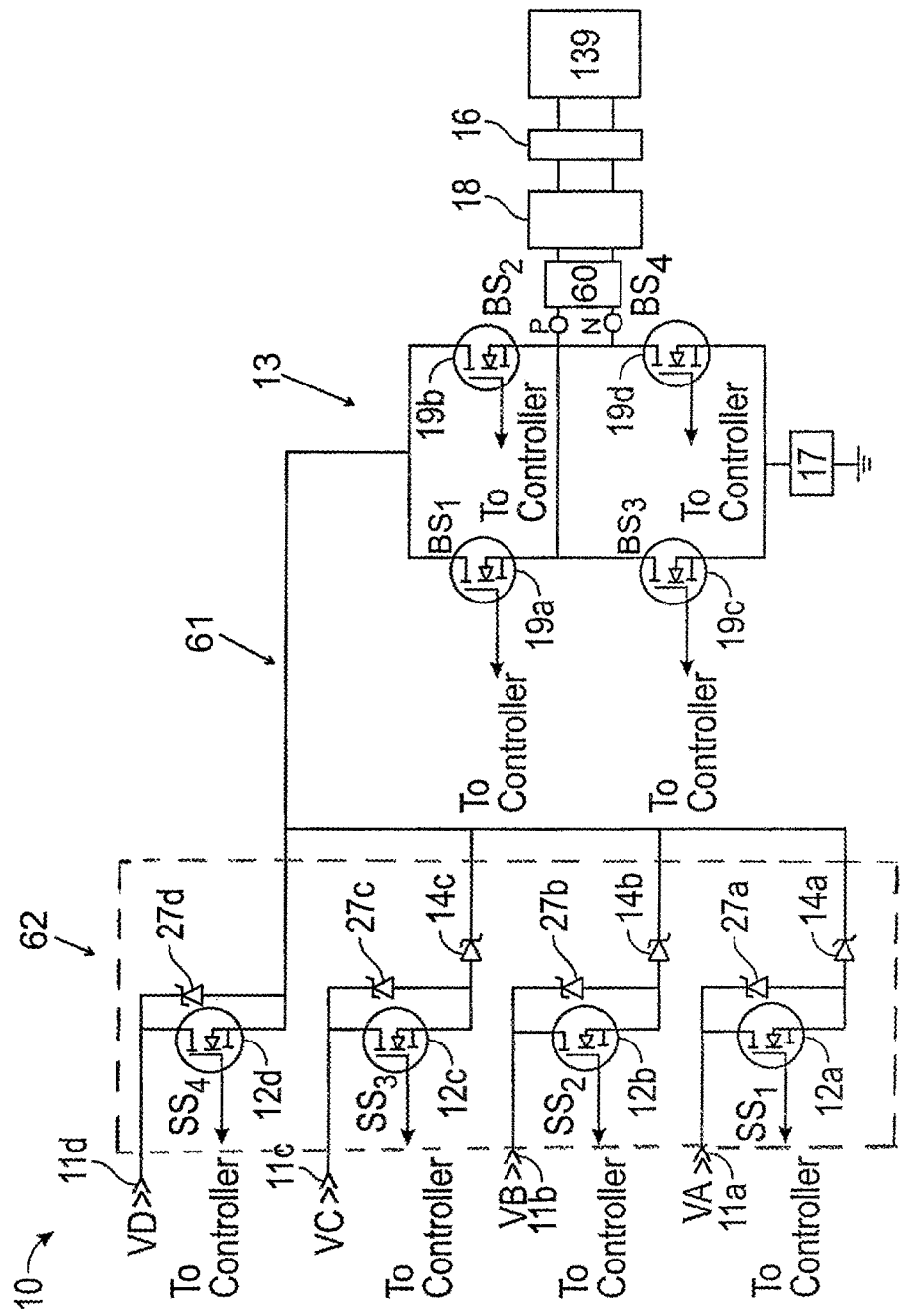
FIG. 1C is a schematic diagram an inverter with a soft fuse system according to certain embodiments.

Hereafter, an apparatus and a method of the present invention will be described in detail by way of an embodiment shown in the attached drawings. In the following detailed description of the present invention, numerous specific details are set forth in order to provide a thorough understanding of the present invention. However, it will be obvious to one with ordinary skill in the art that the present invention may be practiced without these specific details. In other instances, well known methods, procedures, components, and mechanism have not been described in detail as not to unnecessarily obscure aspects of the present invention. While the following detailed description of the present invention is related to at least (i) an inverter with an amplitude pulse width (APW) architecture that generates a single phase AC power signal, (ii) a personal and a personal power plant system using said inverter, and (iii) a method to generate an AC power sine wave with reduced harmonic that maintains an approximately zero DC offset, it is to be appreciated that the present invention and its principal are also applicable to many other devices to provide the same effects.

FIG. 1A is a schematic diagram of an inverter 10, according to various embodiments and illustrates a basic structure of the APW inverter. The inverter 10 may comprises a plurality of DC input terminals 11a-11d, a plurality of semiconductor switches 12a-12d (each switch is labeled SSn) electrically coupled to respective DC input terminals of the plurality of DC input terminals 11a-11d, and a bridge circuit 13. While four semiconductor switches 12a-12d are illustrated in FIG. 1A, it should be appreciated that in some other embodiments, any numbers of semiconductor switches 12a-12d may be utilized. The bridge circuit 13 may be electrically connected to the plurality of semiconductor switches 12a-12d and configured to switch a polarity of a voltage applied to a load coupled thereto. The AC power signal is generated by sequencing (modulating) the semiconductor switches 12a-12d.

Each semiconductor switch may comprise a silicon carbide metal—oxide—semiconductor field-effect transistor (SiC MOS-FET). A high efficiency of the proposed architecture is provided by reducing conduction losses ($I^2R$ losses). Note that R is on-resistance of the MOSFET, I is the root-mean-square (RMS) current through the MOSFET. This is accomplished by using switches with very low R, such as MOSFET. As an example implementing a sine wave inverter with MOSFETs having R values of $15*10^{-3}\Omega$ represents a loss of $(100)^2*15*10^{-3}$ watts=150 watts for a 10,000 watt load. Other types of semiconductor switches that can be used are, for example, bipolar transistors, IGB transistors, thyristors, and silicon controlled rectifiers (SCR). Other periodic waveform, such as trapezoidal, square, or sawtooth, for example, may be approximated.

The inverter 10 may further comprise a plurality of Schottky diodes 14a-14c to prevent reverse current flow and low forward voltage drop losses. An anode of each Schottky diode 14a-14c is electrically coupled to a corresponding semiconductor switch of the plurality of semiconductor switches 12a-12d and a cathode of the corresponding Schottky diode is electrically coupled to the bridge circuit 13. Semiconductor switches 12a-12c are electrically coupled to the bridge circuit 13 through the Schottky diodes 14a-14c. A second Schottky diode 27a-27d may be coupled to each of semiconductor switches 12a-12d. An anode of each second Schottky diode 27a-27d is connected to a source of each MOSFET and a cathode is connected to respective input terminals 11a-11d. Diodes 27a-27d are typically embedded in the transistor but may be included as shown to minimize transistor heating.

As shown in FIG. 1B, the gate drive signal for each semiconductor switch 12a-12d may be configured to operate through optocoupler isolator 15 to prevent high voltages from affecting a system receiving the signal. The H-bridge circuit 13 may be comprised if a plurality of SiC MOS-FET 19a-19-d (each switch is labeled BSn). By using an H-bridge with BS1 and BS2 driven by the variable voltage connection, the AC power signal across 18 can have an approximately zero DC offset. Other types of semiconductor switches that can be used are, for example, bipolar transistors, IGB transistors, thyristors, and silicon controlled rectifiers (SCR). A harmonic filter 16, which reduces spikes and harmonics in the multi-level stepped waveform, a load current sensor 17 and a watt-hour meter 18 may be electrically coupled to the bridge circuit 13.

The plurality of semiconductor switches 12a-12d connect and disconnect DC voltage from the respective DC input terminals 11a-11d to the bridge circuit 13 according to received switching sequences such that a multi-level stepped voltage waveform is generated, where each step of the multi-level stepped waveform has a modulated width (time) of a selected voltage. The load current measured in 17 and 18 is determined by the composite load, 139. The voltages with respect to the reference level are denoted by VA, VB VC, and VD. in FIG. 4. below. Energy may be obtained from batteries/capacitors or another DC sources that are switched on and off during the generation of the output AC voltage signal. In operation, a multilevel stepped DC voltage is applied across the bridge circuit 13. The bridge DC value is switched from low values to high values and back from high values to low values as the output (AC) increases from zero to a peak value and back from the peak value to zero for both the positive and negative signal regions. The DC voltage that supplies the bridge circuit 13 is increased/decreased in conjunction with the sequence of AC values to be generated where the effective AC values can be equal to or less than the DC voltage being applied to the bridge circuit 13—One embodiment employs a multi-level (three or four level) voltage switching arrangement. Other embodiments employ less than three levels or more than four levels.

Figure 2:
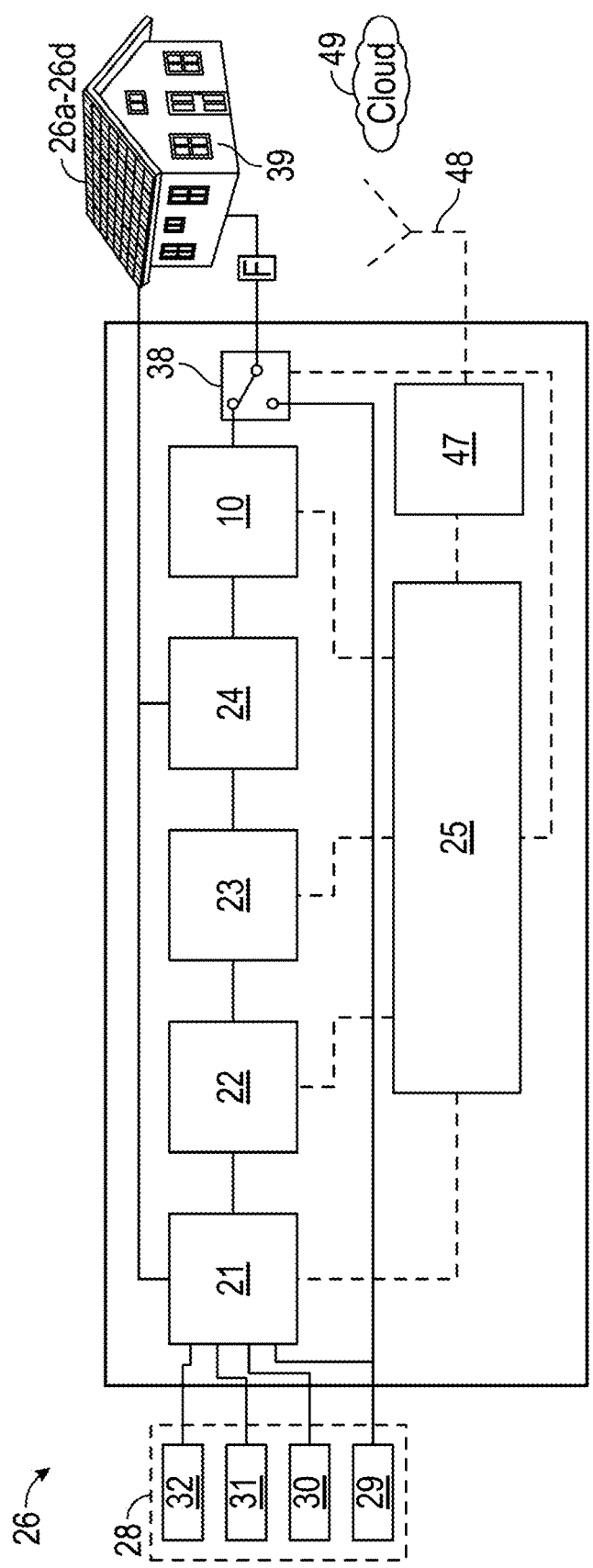
FIG. 2 is a block diagram illustrating a residence having a personal power plant according to certain embodiments.

It will be appreciated that the present disclosure also relates to a personal power plant system utilizing the above mentioned inverter 10. FIG. 2 shows a block diagram illustrating a residence having the personal power plant according to certain embodiments. The personal power plant system 20 converts energy that has been stored in a battery bank 24 as electro chemical energy into an AC voltage. Energy from other different sources, such as solar, wind, heat, moving water, steam, electric power grid etc., is converted and stored as electro-chemical energy in a (DC) battery or battery equivalent. It will be appreciated that electrons from energy sources may be directly used as AC electrons without first being stored. This provides high conversion efficiencies. The dashed lines represent control and status signals and the solid lines represent electrical signals. The control and status signals can be transmitted over a controller area network and the dashed lines can represent the control and status signals transmitted over a CAN bus. in other aspects, other network protocols can be used.

The personal power plant system 20 may comprise an input selector 21, a charger 22, a battery selector 23, the battery bank 24, a controller 25, transmit/receive (RX/TX) wireless link 47, a plurality of solar panels 26a-26d, and the inverter 10, in which the semiconductor switches may comprise MOS-FETs. The inverter 10 further comprises a bridge circuit, such as the bridge circuit 13. The bridge circuit 13 may be an H-bridge comprising MOS-FETs. The load current sensor 17 and the watt-hour meter 18 may be electrically coupled to the bridge circuit 13, as illustrated in FIG. 1A.

Figure 3:
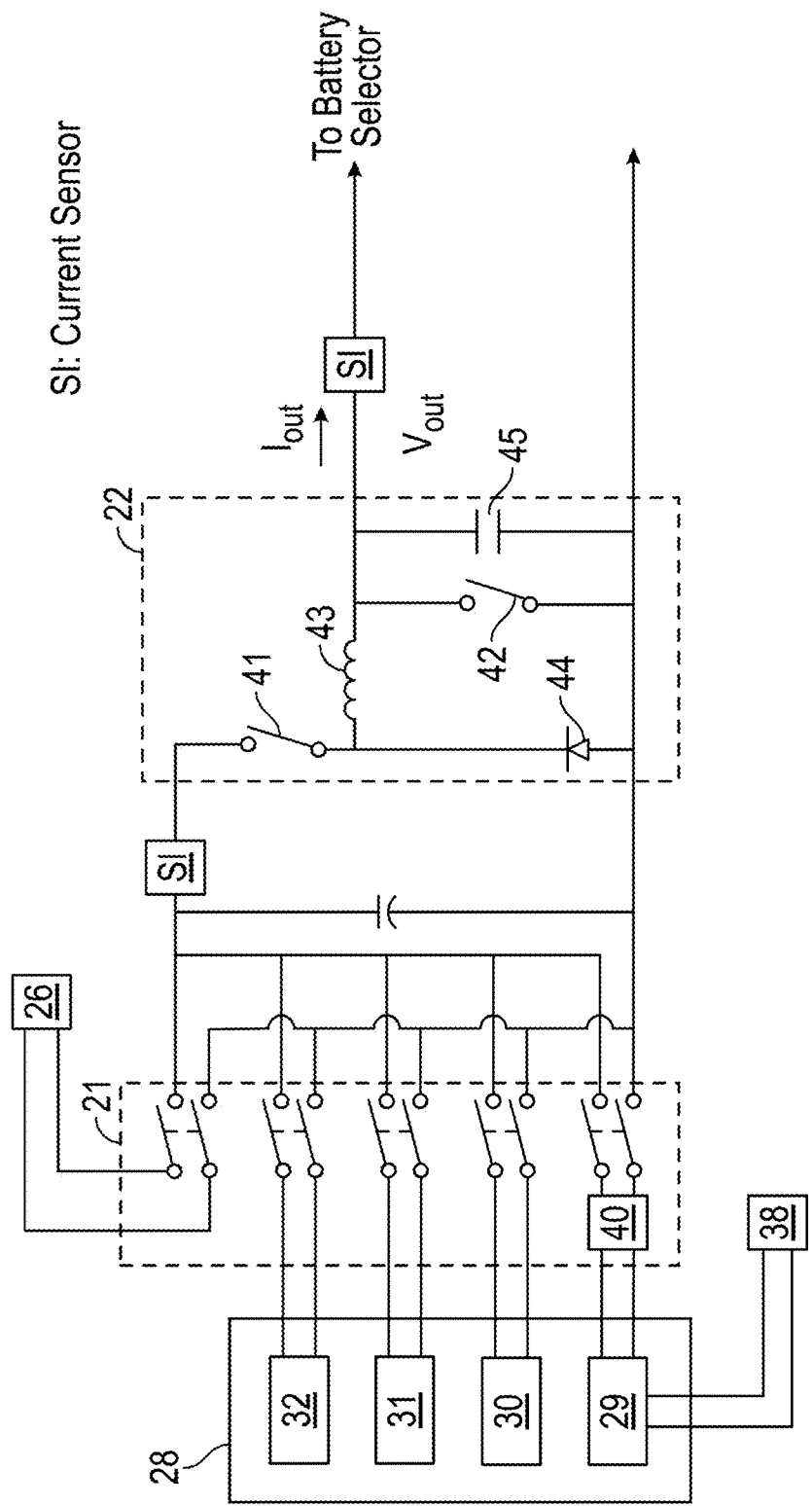
FIG. 3 is a schematic diagram of an input selector and a charger according to certain embodiments.
Figure 4:
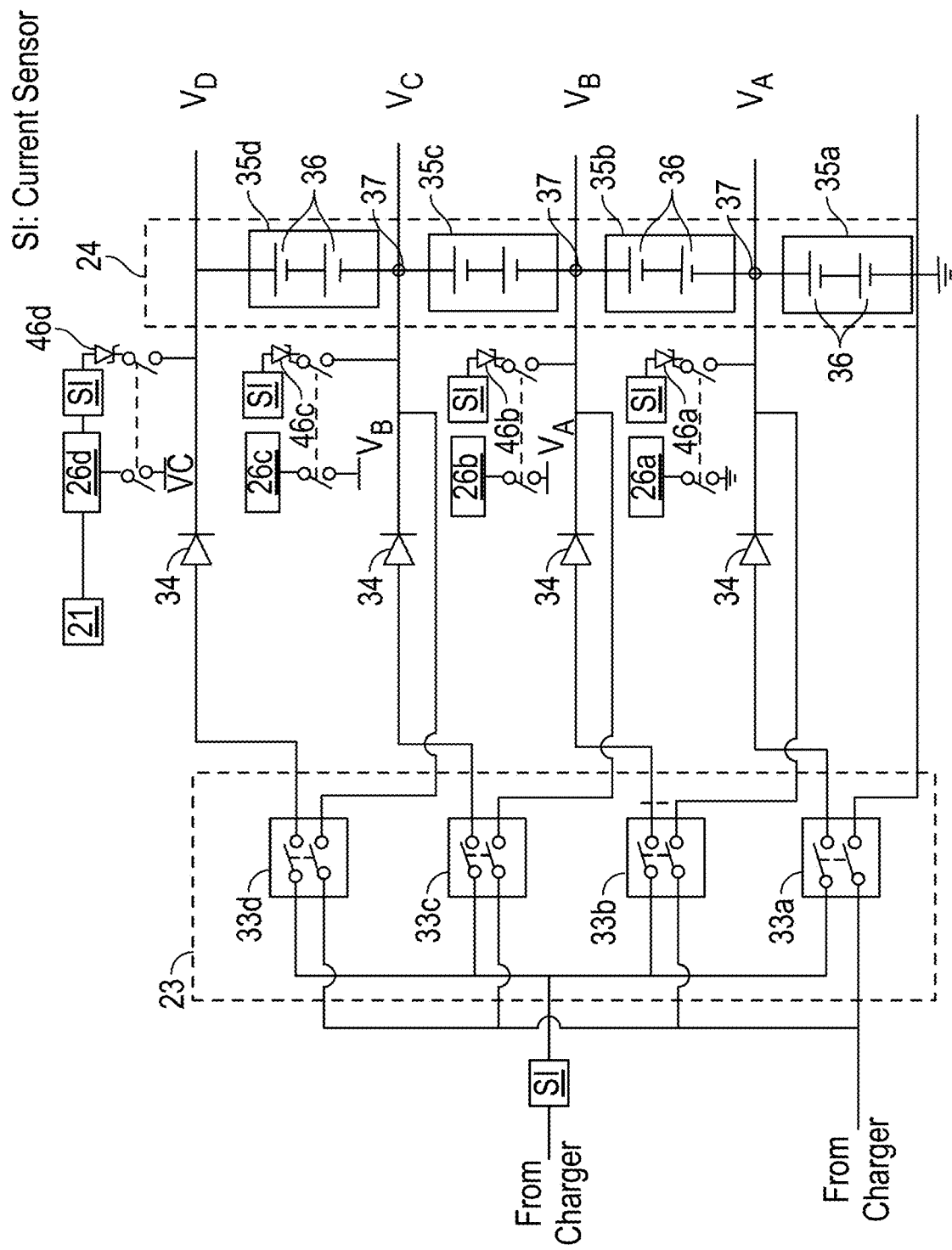
FIG. 4 is a schematic diagram of a battery selector and a battery bank according to certain embodiments.

FIG. 3 is a block diagram of an input selector 21 and a charger 22 according to certain embodiments. The input selector may comprise a plurality of switches and further comprise a rectifier 40. The charger 22 may be configured to charge the battery bank 24 shown in FIG. 4. FIG. 4 is a block diagram of a battery selector 23 and the battery bank 24 according to certain embodiments. The battery selector 23 may comprise a plurality of switches 33a-33d configured to select one or more of a plurality of battery cassettes 35 of the battery bank 24 to charge.

Operation of the personal power plant 20 will be described with reference to FIGS. 3 and 4. As shown in FIGS. 3 and 4, the input selector 21 may comprise switches to select a power source 28 to charge the battery bank 24 and a rectifier 40, which is used when the input source is AC. The battery bank 24 may comprise a plurality of battery cassettes 35 coupled in series, while each battery cassette 35 may comprises one or more cells or batteries 36 connected in series. In some embodiments, the batteries 36 in FIG. 4 may be lithium ferrite batteries, alkaline batteries, lead acid-carbon batteries, sodium NiMH batteries, Ni-Cd batteries, super capacitors, or other types of batteries. In some embodiments, the battery cassettes 35 in FIG. 4 may include carbon anode terminals or lead-carbon capacitors in electrodes as in an Ultra-Battery configuration. Although, two batteries 36 in each battery cassette 35 are illustrated in FIG. 4, it should be appreciated that in some other embodiments, the battery cassette 35 may comprise any numbers of batteries 36. In some embodiments, the battery bank 24 may comprises four battery cassettes 35, where each battery cassette 35 comprises at least one battery 36. In other aspects, the battery bank 24 comprises less than four battery cassettes 35 or more than four battery cassettes 35. In some embodiments, each battery cassette 35 may have approximately a same voltage.

In other aspects, each battery cassette 35 may have an approximately 50 volt electrical potential. The battery selector 23 may comprise a plurality of switches 33a-33d configured to select one or more of the plurality of battery cassettes 35 to charge.

Referring to FIG. 2, the power source 28 may comprise one or more of an electric grid 29, a gas generator 30, a wind turbine 31, the solar panels 26a-26d, and fuel cells 32. The personal power plant system 20 may further comprise a transfer switch 38, which normally permits an AC output from the inverter 10 to electrically couple with a residential load 39 to supply electrical energy from the personal power plant 20 to the residential load 39. When the transfer switch 38 is toggled, the personal power plant system 20 can be electrically disconnected from the residential load 39 and the residential load 39 can be electrically connected to the electrical grid 29 such that the electrical grid 29 provides electrical energy to the residential load 39. Accordingly, the battery bank 24, the charger 22, the battery selector 23, and the inverter 10 can be bypassed. This can occur, for example, during a failsafe mode, when the battery bank 24 is out of energy, when the output is a DC voltage, or when the battery bank 24 has less than a threshold amount of energy. In some embodiments, the input selector 21 can select the electrical grid 29, while the transfer switch 38 couples the residential load 39 to the electrical grid 29 such that current is provided from the electrical grid 29 to both charge the battery bank 24 and to power the residential load 39, bypassing the inverter 10.

With reference to FIG. 3, the charger 22 may receive the DC output voltage from the input selector 21 and can generate a fixed DC output current. The charger 22 may include a switch 41, a switch 42, an inductor 43, an output capacitor 45, and a diode 44. One of the switches 41, 42 can be closed while the other of the switches 41, 42 can be open. The amperage of the DC output current can be based on the voltage of the DC input signal. The amperage of the DC output current can also be based on timings of switches 41, 42, such as a duty cycle or switching speed. The switches 41, 42 may be configured to open and close at various timings and frequencies to control an amount of current provided at the output. Other types of controllable voltage to current converters, including DC to DC converters, can also be used. The switches 41, 42 of the charger 22 can be modulated to maintain an output voltage Vout greater than or equal to a voltage of a battery cassette 35 to be charged.

As indicated in FIGS. 3 and 4, the plurality of solar panels 26a-26d may electrically couple to respective battery cassettes 35 of the battery bank 24, and ones of the plurality of solar panels 26 may electrically couple to the input selector 21. The plurality of solar panels 26a-26d may be configured to charge respective battery cassette 35 and an output voltage of each solar panels can be greater than an output voltage of each of the plurality of battery cassette. As described above, the battery bank 24 may include the plurality of battery cassettes 35 that are coupled in series. A voltage output can be taken across any of the battery cassettes 35 at center taps 37 and a positive electrode of the battery bank 24 labeled $V_A$, $V_B$, $V_C$, and $V_D$. The plurality of battery cassettes 35 may be charged from any member of the power source 28 configuring the switches in the input selector 21. Each battery cassette 35 of the plurality of batteries has approximately the same electrical potential.

The diodes 34 prevent backward current flow from the battery cassettes 35. The battery cassettes 35a-35d may also be configured to be charged by the respective solar panels 26a-26d. Diodes 46a-46d may prevent backward current flow from the battery cassettes 35a-35d to the solar panels 26a-26d. Switching losses are minimized by using the switch-diode topology. The charger 22 may be configured to provide current outputs to a load at each of $V_A$, $V_B$, $V_C$, and $V_D$ or $V_A$-$V_B$ and $V_C$-$V_D$ even while the battery bank 24 is being charged or balanced. When using the solar panels 26a-26d to directly charge the battery cassettes 35, the maximum panel output voltage will be slightly greater than the battery voltage to maximize energy transfer efficiency. To obtain maximum power transfer efficiency from the panel, the panel output should be adjusted to match the internal impedance of the battery.

The personal power plant system 20 may also comprise a controller 25 configured to generate a predetermined switching sequence to be applied to the plurality of semiconductor switches 12a-12d comprising MOS-FETS of the inverter 10. The controller 25 may comprise one or more physical computing systems, hardware computer CPUs, application-specific circuitry, and/or electronic hardware configured to execute specific and particular computer instructions. The controller 25 is configured to sequentially connect and disconnect the MOS-FETS of the plurality of semiconductor switches 12a-12d to vary an amplitude and/or pulse width of a voltage step. Thus, a multi-level stepped voltage waveform with a modulation of a selected step thereof can be applied across the bridge circuit 13 and an output from the bridge circuit 13 approximates an AC power sine wave with reduced harmonic distortion. The modulation permits one or more of variation in umber of batteries, variation in battery voltages, variation in step duration, and variation in number of steps in any given sine wave approximation. A system which comprises four batteries can produce an AC power signal with less than 10% total harmonic distortion (THD). The controller 25 may be further configured to modify the predetermined switching sequences based at least in part on feedback from the load current sensor 17 and the watt-hour meter 18. The RMS voltage of the inverter output may be changed by modifying the modulation timing. For example, increasing the width of a battery on time will increase the RMS output voltage value. The state of charge, SOC, of a battery may be expressed in xxx hours, amps x time. In a single cycle, the increase/decrease in SOC of a battery is determined by the net battery current multiplied by the battery on time. Updating the SOC value can be done by computing: SOC $(t+\Delta t)$=SOC$(t)\pm I_{BATTERY}$(NET)$\times \Delta t$, when $\Delta t$=the single cycle duration.

The personal power plant system 20 may further comprise a transmit/receive (RX/TX) wireless link 47 in communication with an antenna 48 to send data and status of the system and receive data to determine the least expensive times of day to charge the battery bank 24 from the distribution system 29. For example, the controller 25 can be configured to request and receive via the TX/RX wireless link 47 the rate schedule from the distribution system 29. The TX/RX wireless link 47 and the antenna 48 can be configured to transmit and receive messages via a cloud network 49, such as the Internet. In some embodiments, the TX/RX wireless link 47 and the antenna 48 can be replaced with a digital network communication device configured for internet access over land lines.

The present disclosure further relates to a method for converting DC voltage to AC voltage with an inverter including a plurality of DC input terminals 11a-11d, a plurality of semiconductor switches 12a-12d electrically coupled to respective DC input terminals 11a-11d, and a bridge circuit 13 configured to switch a polarity of a voltage applied to a load coupled thereto. It will be appreciated that each of the processes, methods, and algorithms described herein and/or depicted in the figures may be embodied in, and fully or partially automated by, code modules executed by one or more physical computing systems, hardware computer processors, application-specific circuitry, and/or electronic hardware configured to execute specific and particular computer instructions. For example, computing systems may include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some embodiments, particular operations and methods may be performed by circuitry that is specific to a given function.

Figure 5:
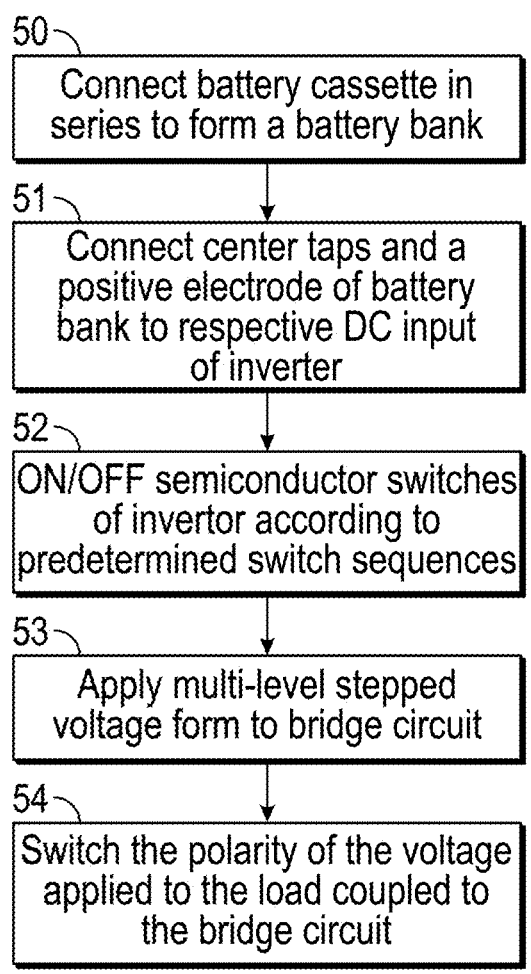
FIG. 5 is a flow chart illustrating a process for converting DC voltage to AC voltage according to certain embodiments.

FIG. 5 is a flow chart generally illustrating the method for converting DC voltage to AC voltage. At block 50, the plurality of battery cassettes 35 are connected in series providing center taps 37 therebetween. At block 51, the center taps and a positive electrode of the battery bank are connected to respective DC input terminals. At block 52, the plurality of semiconductor switches 12 are operated according to predetermined switching sequences such that a multi-level stepped voltage waveform with a modulated width of selected step thereof is generated. The multi-level stepped voltage waveform approximates a half cycle of a sine wave and the multi-level stepped voltage waveform is applied to the bridge circuit 13 at block 53. At block 54, the polarity of the voltage applied to the load 39 coupled to the bridge circuit 13 is switched when the multi-level stepped voltage waveform is at approximately zero voltage, so as to generate an AC power sine wave with reduced harmonic distortion.

Figure 6:
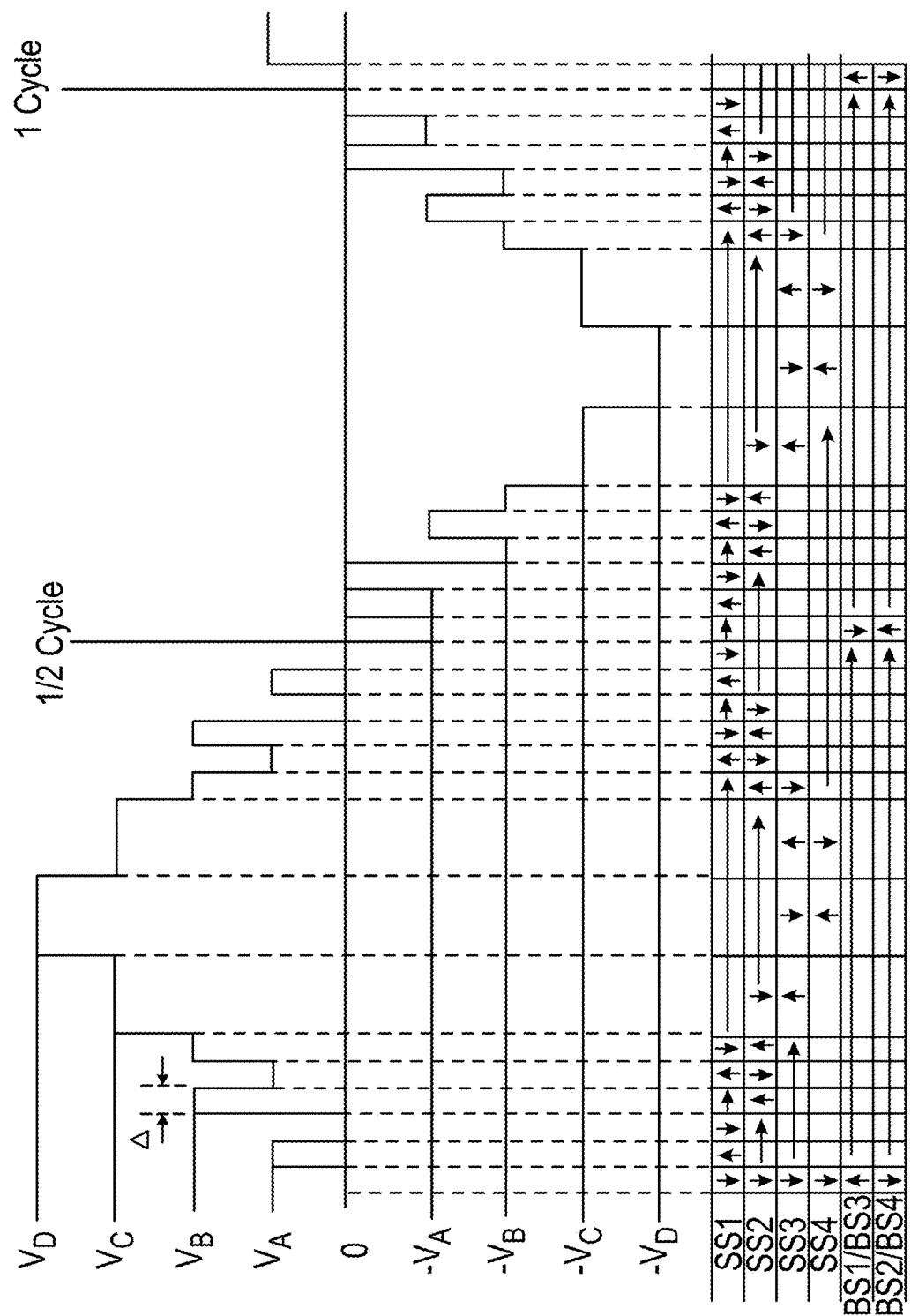
FIG. 6 shows a table indicating switching sequences and a representation of an output AC voltage from a bridge circuit before a harmonic filter according to certain embodiments.

FIG. 6 depicts an approximation of the sine wave signal. The multi-level stepped voltage waveform with a modulated width of selected step is generated by sequencing the semiconductor switches 12a-12d and the MOS-FETs 19a-19d in the H-bridge circuit 13 to achieve desired modification. The generated wave form is formulated to provide an RMS value equal or approximately equal to the sine wave. The switch sequences are listed in the table. "↑" represent an on state of the switch, "↓" represents an off state of the switch, and "Δ" represents a time interval. By using smaller time intervals, the approximation process can be improved.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "may", "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Additional Embodiments of the inverter and personal power system

FIG. 1C shows the APW power DC to AC inverter architecture. The inverter inputs, VA, VB, VC, VD and ground (Return) are terminal voltages of the series connected batteries in the battery bank 24 in FIG. 4. FIG. 1C illustrates a four battery cassette version of the inverter. The number of battery cassettes 35 can typically range from 2 to 8, depending on the value of the AC voltage being generated. The batteries form a DC energy source to the modulator 62, which comprises the semiconductor switches 12a, 12b, 12c, and 12d comprising MOS-FETS. Modulation of the MOS FET transistors causes a varying voltage on conductor 61. The H bridge formed from transistors BS1, BS2, BS3, and BS4 enables generation of a symmetric zero offset sine wave. A modulation control is provided from a controller 25 that is programmed to activate transistor gate switches SS1, SS2, SS3, and SS4. The modulation signal durations and sequencing is defined by firmware in the controller. Each semiconductor switch may comprise a silicon carbide metal—oxide—semiconductor field-effect transistor (SiC MOS-FET) that can carry greater than 200 AMPs with low loss and withstand short period high drain current pulses.

The APW modulation scheme employs the controller 25 to sequentially turn the semiconductor switches 12a, 12b, 12c, and 12d on and off at precise times and for precise durations with a resolution of +/−500 nanosecond or less. A half cycle sine wave can be generated and turned into a full-cycle sine wave using the H Bridge circuit 13. The voltage across P and N terminals is positive when transistors BS1 and BS4 are on and BS3 and BS2 are off. For example, if all of the semiconductor switches 12a, 12b, 12c, and 12d are in the off position at time zero, and the semiconductor switch 12a is turned on, the voltage across P N will be the voltage of the battery cassette 35a. Depending on the modulation scheme, the controller generates switch gate control signals that turn on and off the VA, VB, VC, VD voltages. To generate a 60 Hertz signal, a symmetric six step approximation, is a repeating 12 interval scheme that repeats every half cycle. For example, the time duration of each step for a 60 Hertz voltage is approximately $1/60 \text{ Hz} \times 1/2$ or 8.33 milliseconds/12 =694 microseconds. A pulse width modulation (PWM) may also occur within each step to produce smaller 'steps'.

The power output voltage signal across PN terminals generated by the modulator 62 directly reflects the modulation pattern by generating a sequence of steps that approximates a sine wave. The H Bridge 13 is used to produce a sine wave with zero offset that has an amplitude of 2× Vpeak. Using resultant theory, modulation signals may be developed that minimize odd harmonics and provide total harmonic distortion levels less than 10 percent.

A power inverter should have the capability to withstand AC over current without damage. To provide this, the design implements a Soft Fuse. A soft fuse can be implemented by monitoring of the current sensor output. If for example, a short circuit occurs across the PN terminals at the zero crossing point, the current will increase from zero to several hundred amperes, as the voltage on the conductor 61 increases from zero to VA, to VB, to VC etc. The first level of overcurrent protection is a Circuit Breaker 60, shown in FIG. 1C. If for example, the Circuit Breaker 60 is specified at 80 Amps, it can take as much as 10 seconds to open if the current rating is exceeded. $I^2R$ heating will quickly stress components and can cause a fire. The Soft Fuse operation is aimed at interrupting operation if the current exceeds a value higher than the Circuit Breaker 60 rating. Details of Soft Fuse operation are as follows.

The inverter current is monitored continuously by the current sensor 17. If at any time a maximum current is exceeded, the controller deactivate (opens) all of all of the semiconductor switches 12a, 12b, 12c, and 12d. The MOS-FETs 19a-19d in the H-bridge circuit 13 may also be deactivated as well. For a resistive load, the output current will be Vout(t)/R load, and the power delivered to the load will be $[\text{Vout}(t)/R]^2 \times R$ where Vout is the voltage across P and N terminals. The current sensor 17 measures the real time current with a delay of a few microseconds. The measurement is monitored by the controller 25. If the load 139 in FIG. 1C is inductive, the diode bridge made up of body diodes (not shown) of the transistors SS1-SS4, BS1-BS4 will conduct the current as the voltage decays. The peak voltage can be limited to VD plus a diode drop from the diode 27d.

The AC output voltage across PN terminals is the signal generated by the modulator 62. V(t) is the time varying voltage that determines the output current as described above. If the load R is small, for example 1 Ohm and at time t, the voltage is 50 volts, the output current will be 50 amps. The microcontroller recognizes that a current of 50 amps at 50 volts will increase to 100 amps at 100 Volts and so on. For example, if the maximum permissible current is approximately 150 amps, the controller will disable the modulator 62, if the voltage across PN terminal, which is measured by the watt-hour meter 18, is approximately 50 volts and the current is greater than approximately 30 Amps. Similarly, if the voltage is 100 volts and the current is greater than 60 amps, then the modulator 62 will be disabled.

FIG. 1C illustrates typical 4 battery configuration. The load current between P and N is measured by the current sensor 17. In most applications, the maximum permissible current will be specified to correspond to the peak power provided by the inverter. For a load RL, and a maximum specified power of PMAX, the maximum permissible RMS current is (PMAX/VMAX). Note that for peak values we use RMS values and factor these values to peak values. For a 4 battery inverter VMAX is equal to 4×VBATT (50) and for sake of this example all batteries are 50 volt batteries. So if PMAX is 10 kW RMS (a peak of 10,000 W×1.4) then I max is 70 AMPS. V Peak is 200V. To protect against over currents, the load current, 17, is measured as the modulator control signals are sequentially applied. Maximum allowable currents during each interval are as follows.

VA on. 25 Amps
VA+vB on: 50 Amps.
VA+vB+vC on: 75 Amps.
VA+vB+vC +vD on: 100 Amps.

If any of these values are exceeded, the inverter will shut off: all transistors will be turned OFF. The above approach can be modified for different maximum currents of power levels.

When the over current is detected and the cause is removed, the modulator 62 can be re-activated. One method to determine that the short circuit has been removed is to turn on the semiconductor switches 12a of the modulator 62, such that only the voltage of the battery cassette 35a is applied, for several microseconds. If the current is less than a predetermined value, which is determined based at least in part on the output voltage from the modulator 62, the current sensor measurement, and the rated current of the circuit breaker, then the inverter may be re-enabled. Otherwise, the modulator will turn off and the system will enter the standby state. This software fuse is very fast at reacting. For example, the software fuse can take a maximum of approximately 2 milliseconds to deactivate if the maximum current level is exceeded.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted based on the language employed in the claims and not limited to the examples described in the present specification or during the prosecution of the application, which examples are to be construed as non-exclusive.

What is claimed is:

1. A power inverter having AC over current protection, the power inverter comprising:
   a plurality of DC input terminals wherein each DC input terminal is electrically coupled to respective battery cassettes of the battery bank;
   a bridge circuit configured to switch a polarity of a voltage applied to a load electrically coupled thereto;
   a modulator comprising a plurality of semiconductor switches comprising MOS-FETS electrically coupled to respective DC input terminals, wherein the plurality of semiconductor switches are electrically coupled to the bridge circuit; and
   a plurality of Schottky diodes to prevent backward current flow, wherein an anode of each Schottky diode is electrically coupled to a corresponding semiconductor switch of the plurality of semiconductor switches and a cathode of each Schottky diode is electrically coupled to the bridge circuit;
   wherein the plurality of semiconductor switches connect and disconnect DC current from the respective DC input terminals to the bridge circuit according to received switching sequences such that a multi-level stepped voltage waveform is generated, each step of the multi-level stepped waveform having a modulated width of a selected voltage; and
   a soft fuse system comprising:
      a load current sensor disposed between the bridge circuit and ground to continuously monitor an inverter current;
      a circuit breaker electronically coupled to the bridge circuit; and
      a controller configured to:
         monitor the inverter current by the load current sensor;
         monitor an output voltage from the modulator; and
         disable the modulator by turning off the plurality of semiconductor switches within a prescribed period of time, when the inverter current exceeds a predetermined value.

2. The power inverter according to claim 1, wherein the predetermine value is determined based at least on the inverter current detected by the load current sensor, the output voltage from the modulator and a rated current of the circuit breaker, and the prescribed period of time is 2 milliseconds or less.

3. The power inverter according to claim 1, wherein the bridge circuit is an H-bridge comprising MOS-FETs.

4. The power inverter according to claim 1, wherein the controller further configured to:
   turn on one of the plurality of semiconductor switches for an enough period of time to detect the inverter current by the load sensor after removal of a cause of the exceeding inverter current, and
   enable the modulator when the invertor load current is less than the predetermined value.

5. The power inverter according to claim 1, wherein the modulator and the bridge circuit are disabled when the inverter current exceeds the predetermined value.

6. A method to prevent AC over current for a power inverter, the method comprising:
with an inverter including a plurality of DC input terminals, a modulator including a plurality of semiconductor switches electrically coupled to respective DC input terminals, a bridge circuit configured to switch a polarity of a voltage applied to a load coupled thereto, and a load current sensor disposed between the bridge circuit and ground to continuously monitor an inverter current,
connecting a plurality of battery cassettes in series to form a battery bank, wherein a center tap is provided between the adjacent battery cassettes;
connecting the center taps and a positive electrode of the battery bank to respective DC input terminals;
operating the plurality of semiconductor switches according to predetermined switching sequences such that a multi-level stepped voltage waveform with a modulated width of selected step thereof is generated;
applying the multi-level stepped voltage waveform to the bridge circuit;
switching the polarity of the voltage applied to the load coupled to the bridge circuit to generate an AC power sine wave with reduced harmonic distortion;
continuously monitoring an inverter current by the load current sensor and an output voltage from the modulator, and
disabling the modulator by turning off the plurality of semiconductor switches within a prescribed period of time, when the inverter current exceeds a predetermined value.

7. The method according to claim 6, wherein the predetermine value is determined based at least on the inverter current detected by the load current sensor, the output voltage from the modulator and a rated current of a circuit breaker electronically coupled to the bridge circuit, and the prescribed period of time is 2 milliseconds.

8. The method according to claim 6 further comprising:
turning on one of the plurality of semiconductor switches for a enough period of time to detect the inverter current by the load sensor after removal of a cause of the exceeding inverter current, and
enabling the modulator when the load current is less than the predetermined value.

9. The method according to claim 6, wherein the modulator and the bridge circuit are disabled when the inverter current exceeds the predetermined value.

10. A personal power plant system comprising:
an input selector configured to select a power source;
a battery bank comprising a plurality of battery cassettes coupled in series, wherein each battery cassette comprises a plurality of batteries connected in series;
a charger configured to charge the battery bank using electrical energy from the selected power source;
a battery selector comprising a plurality of switches configured to select one or more of the plurality of battery cassettes to charge;
a plurality of solar panels electrically coupled to respective battery cassettes of the battery bank, wherein ones of the plurality of solar panels are selectively coupled to the input selector;
an inverter, wherein said inverter comprises:
a plurality of DC input terminals wherein each DC input terminal is electrically coupled to respective battery cassettes of the battery bank;
a bridge circuit configured to switch a polarity of a voltage applied to a load electrically coupled thereto;
a plurality of semiconductor switches comprising MOS-FETS electrically coupled to respective DC input terminals, wherein the plurality of semiconductor switches are electrically coupled to the bridge circuit; and
a plurality of Schottky diode to prevent back backward current flow, wherein an anode of each Schottky diode is electrically coupled to a corresponding semiconductor switch of the plurality of semiconductor switches and a cathode of each Schottky diode is electrically coupled to the bridge circuit; and
a load current sensor disposed between the bridge circuit and ground to continuously monitor an inverter current; and
a controller configured to:
generate a predetermined switching sequence to be applied to the plurality of semiconductor switches,
connect and disconnect the MOS-FETS of the plurality of semiconductor switches to apply a multi-level stepped voltage waveform with a modulation of a selected step thereof across the bridge circuit such that an output from the bridge circuit approximates an AC power sine wave with reduced harmonic distortion;
monitor the inverter current by the load current sensor;
monitor an output voltage from the modulator; and
disable the modulator by turning off the plurality of semiconductor switches within a prescribed period of time, when the inverter current exceeds a predetermined value.

11. The personal power plant system according to claim 10, wherein the predetermine value is determined based at least on the inverter current detected by the load current sensor, the output voltage from the modulator and a rated current of a circuit breaker electronically coupled to the bridge circuit, and the prescribed period of time is 2 milliseconds or less.

12. The personal power plant system according to claim 10, wherein the bridge circuit is an H-bridge comprising MOS-FETs.

13. The personal power plant system according to claim 10, wherein the controller further configured to:
turn on one of the plurality of semiconductor switches for an enough period of time to detect the inverter current by the load sensor after removal of a cause of the exceeding inverter current, and
enable the modulator when the invertor load current is less than the predetermined value.

14. The personal power plant system according to claim 10, wherein the power source comprising an electric grid, a gas generator, a wind turbine, the solar panels, and fuel cells.

15. The personal power plant system according to claim 10, wherein the battery bank comprises four batteries.

16. The personal power plant system according to claim 10, wherein the plurality of solar panels are configured to charge respective battery cassette and an output voltage of each solar panels is greater than an output voltage of each of the plurality of battery cassette.

17. The personal power plant system according to claim 10, wherein each battery cassette of the plurality of battery cassette has approximately a same terminal voltage.

18. The personal power plant system according to claim 10, further comprises a watt-hour meter electrically coupled to the bridge circuit.

19. The personal power plant system according to claim 18, wherein the controller is configured to modify the predetermined switching sequences based at least in part on feedback from the load current sensor and the watt-hour meter.

20. The personal power plant system according to claim 10, further comprising a circuit breaker electronically coupled to the bridge circuit.

* * * * *